United States Patent
Makigaki et al.

[19]
[11] Patent Number: 5,898,652
[45] Date of Patent: Apr. 27, 1999

[54] SUPPORT STRUCTURE FOR AN OPTICAL PICKUP

[75] Inventors: Tomohiro Makigaki; Hirokazu Ito, both of Suwa, Japan

[73] Assignee: Seiko Epson Corporation, Tokyo, Japan

[21] Appl. No.: 08/729,159

[22] Filed: Oct. 11, 1996

Related U.S. Application Data

[63] Continuation-in-part of application No. 08/306,988, Sep. 16, 1994, Pat. No. 5,608,696.

[30] Foreign Application Priority Data

Jul. 8, 1994 [JP] Japan .................................. 6-157450

[51] Int. Cl.$^6$ ...................................................... G11B 7/00
[52] U.S. Cl. ................................... 369/44.16; 369/44.14; 369/44.22
[58] Field of Search ............................ 369/44.14, 44.15, 369/44.16, 44.17, 44.18, 44.19, 44.21, 44.22; 359/821, 823, 824, 813, 814

[56] References Cited

U.S. PATENT DOCUMENTS

| | | |
|---|---|---|
| 4,687,296 | 8/1987 | Terayama et al. . |
| 4,958,336 | 9/1990 | Suzuki et al. . |
| 5,005,162 | 4/1991 | Mitsumori et al. . |
| 5,046,820 | 9/1991 | Saekusa et al. ...................... 369/44.15 |
| 5,062,095 | 10/1991 | Horikawa et al. . |
| 5,140,471 | 8/1992 | Kasahara . |
| 5,323,378 | 6/1994 | Kim et al. . |

FOREIGN PATENT DOCUMENTS

| | | |
|---|---|---|
| 59-154656 | 9/1984 | Japan . |
| 60-30017 | 7/1985 | Japan . |
| 62-40627 | 2/1987 | Japan . |
| 63-20732 | 1/1988 | Japan . |
| 5-135384 | 6/1993 | Japan . |

*Primary Examiner*—Thang V. Tran
*Attorney, Agent, or Firm*—Oliff & Berridge, PLC

[57] ABSTRACT

An optical pickup includes a movable unit supported in such a manner that the movable unit can move in tracking directions as well as in focusing directions. The movable unit has a laser unit including an objective lens, a reflecting mechanism, a light source, and a light detecting mechanism all constructed in an integral fashion. An axis of rotation of the movable unit intersects an optical axis of a light beam emitted by the laser unit. Also provided are two rotating mechanisms (for example, pivot pins or hinges) separately disposed in a direction along the axis of rotation, both rotating mechanisms having a common axis of rotation. Such an arrangement makes it possible to realize a small-sized, optical pickup having a driving mechanism suitable for high speed seeking. Such an optical pickup makes it possible to realize an optical recording/reproducing apparatus that can transfer data at a high rate of speed over a short access time.

9 Claims, 11 Drawing Sheets

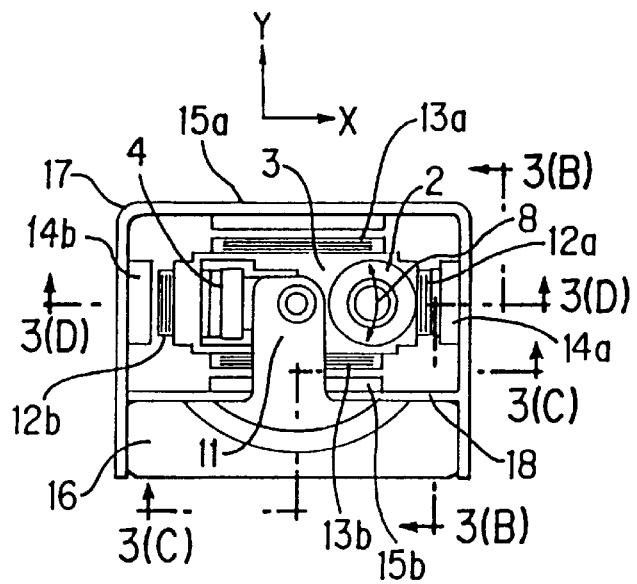
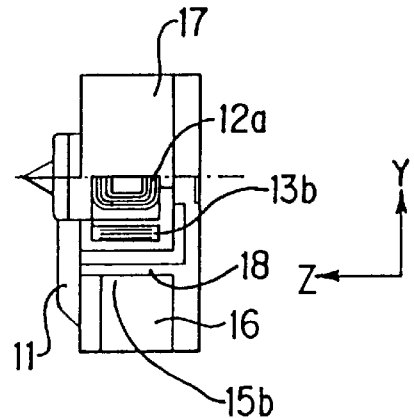
FIG. 3(A)
FIG. 3(B)
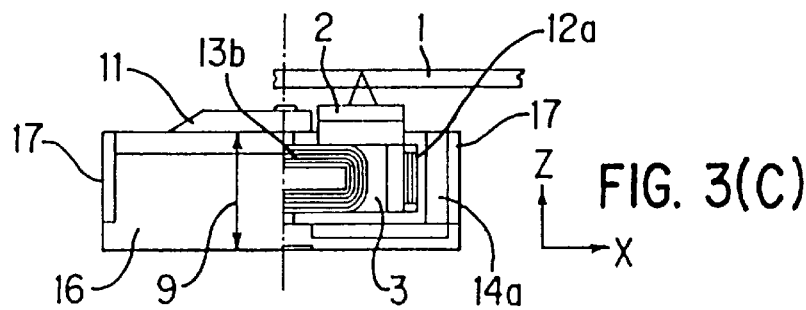
FIG. 3(C)
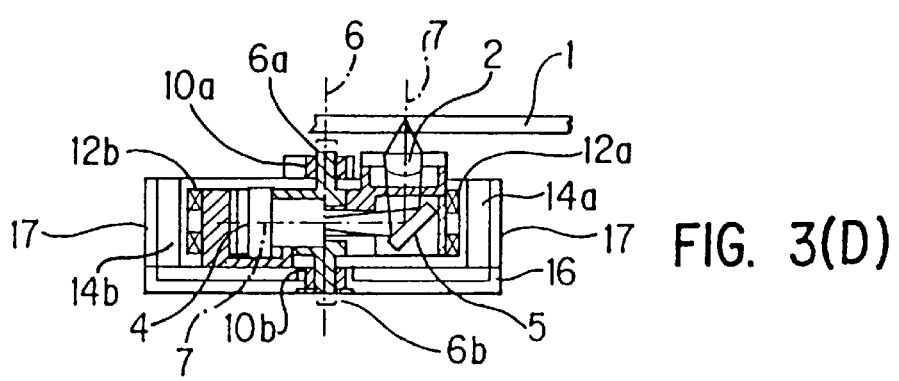
FIG. 3(D)

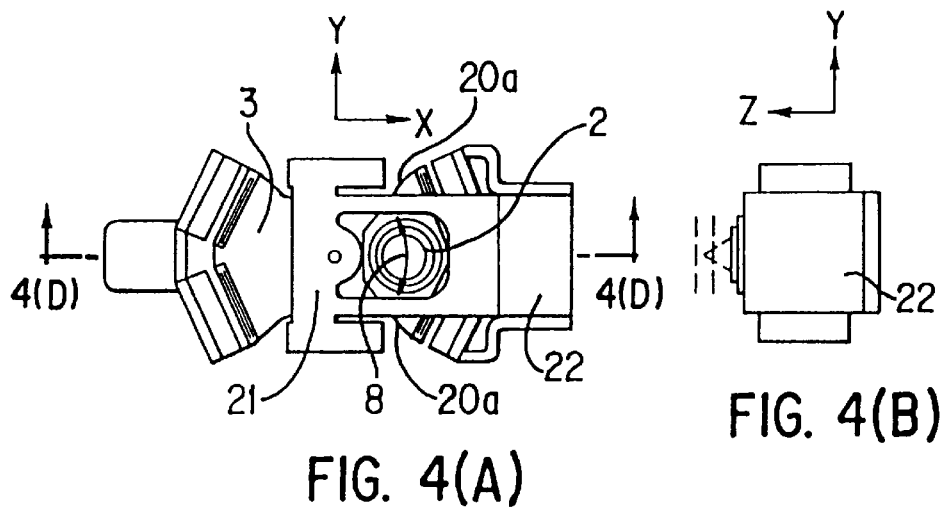
FIG. 4(A)
FIG. 4(B)
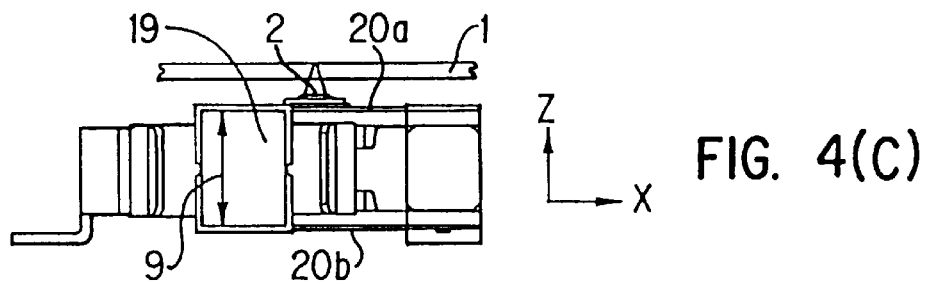
FIG. 4(C)
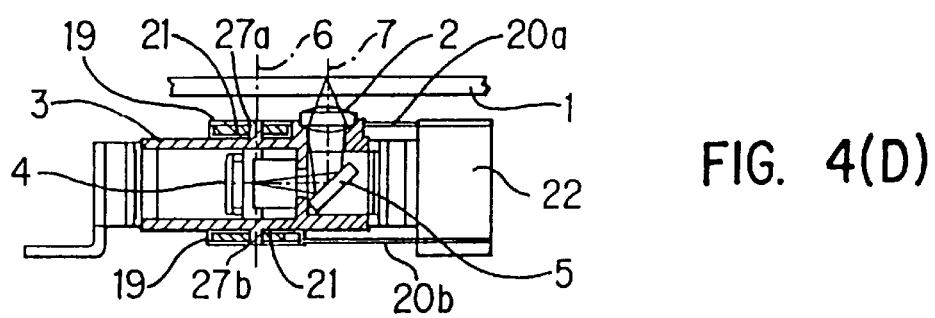
FIG. 4(D)
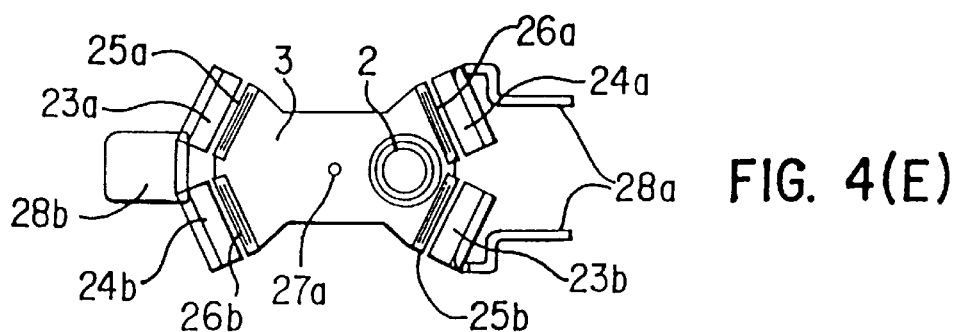
FIG. 4(E)

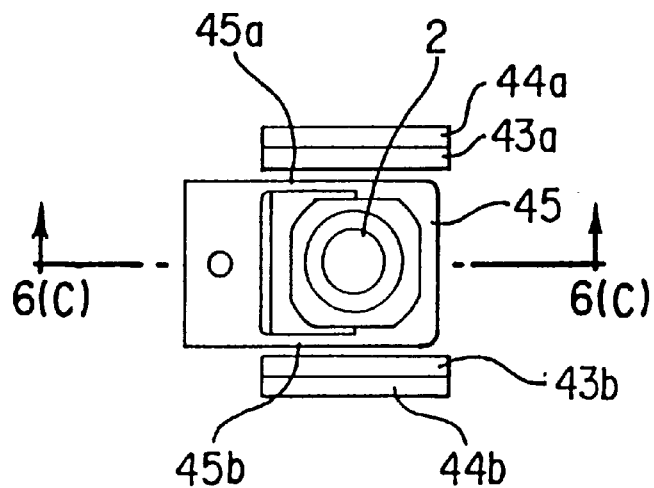
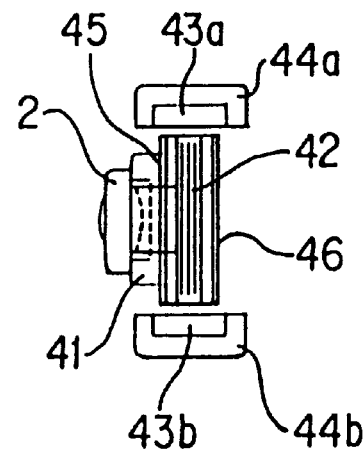
FIG. 6(A)    FIG. 6(B)
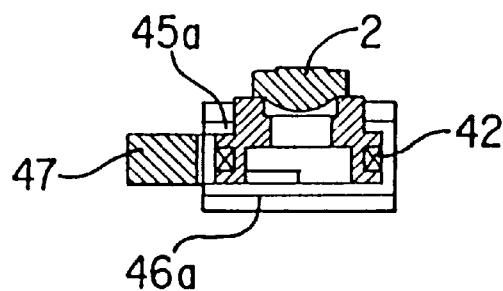
FIG. 6(C)

SUPPORT STRUCTURE FOR AN OPTICAL PICKUP

This is a Continuation-in-Part of application Ser. No. 08/306,988, filed Sep. 16, 1994, now U.S. Pat. No. 5,608,696.

BACKGROUND OF THE INVENTION

1. Field of the Invention

The present invention relates to an optical pickup mechanism for use in an optical recording/reproducing apparatus.

2. Description of the Related Art

In a conventional rotation-type optical pickup, as illustrated in FIG. 6 of Japanese Patent Publication No. 60-30017, the optical axis of a light beam of a movable unit includes an objective lens that extends toward the outside of the movable unit along a path parallel to the rotation axis.

In the case of an optical pickup having a laser unit in a movable unit, the optical axis of a light beam is also parallel to the rotation axis, as shown in FIG. 9 of Japanese Patent Publication No. 60-30017.

On the other hand, in an optical pickup having a supporting mechanism including a parallel plate spring and a rotating hinge, as shown in FIGS. 6 and 8 of Japanese Laid-Open Patent Application No. 62-40627, only one rotating hinge is used, and the optical axis extends to the outside of a movable unit along a path parallel to the rotation axis.

There is a great need for a high-performance optical recording/reproducing apparatus that can transfer data at a high speed with a short access time. However, in a conventional rotation-type optical pickup, if a laser unit is included in a movable unit in an integral fashion to achieve a small size and light weight, the optical path must be off the rotation axis, and thus the size expands in a plane. As a result, it is impossible to reduce the weight of a movable unit.

Another problem is that if component parts are disposed asymmetrically about the axis of rotation, a weight imbalance occurs.

In a conventional rotation-type optical pickup, when it is required to increase the driving force to achieve a higher operation speed, the following known techniques are available. A first technique employs a larger coil. However, this conventional technique has a disadvantage in that the outside dimensions become greater. A second technique is to employ a thicker magnet. This technique also has disadvantages in that the outside dimensions become greater and when a magnetic circuit with no opposing yoke is used the linear range in driving force becomes narrow.

SUMMARY OF THE INVENTION

To solve the above and other problems, according to a first aspect of the present invention, there is provided an optical pickup for use in an optical recording/reproducing apparatus wherein a laser unit and an objective lens are driven in an integral fashion, wherein the axis of rotation about which the objective lens rotates is located at a position displaced from the center of the objective lens. In addition, the axis of rotation intersects the optical axis of a light beam emitted by the laser unit.

According to a second aspect of the present invention, there is provided an optical pickup wherein the laser unit is disposed at one side of a plane containing the axis of rotation about which the objective lens rotates. The axis of rotation is located at a position displaced from the center of the objective lens, the above-described plane further containing a line that intersects the rotation axis, the line being parallel to a seeking direction. The objective lens is disposed at the other side of the plane.

According to a third aspect of the present invention, there is provided an optical pickup wherein the center of gravity associated with the movable unit, which includes the laser unit and the objective lens installed in an integrated fashion, is located on the axis of rotation.

According to a fourth aspect of the present invention, there is provided an optical pickup wherein the center of gravity is located in a plane including movable end portions of two or more focusing plate springs.

According to a fifth aspect of the present invention, there is provided an optical pickup that includes two parallel plate springs for supporting the movable unit in a focusing directions, the movable unit including the laser unit and the objective lens; and a rotating hinge that supports the movable unit such that the movable unit can move freely in tracking directions, the rotating hinge being separately disposed in the direction of the rotation axis.

According to a sixth aspect of the present invention, there is provided an optical pickup wherein one or more coils for driving the movable unit, which includes the laser unit and the objective lens in focusing directions are disposed on cylindrical surfaces, each cylindrical surface having the center axis coincident with the rotation axis, each cylindrical surface having the same diameter; and one or more coils for driving the movable unit in tracking directions are disposed on a cylindrical surface coaxial to the cylindrical surfaces.

According to a seventh aspect of the present invention, there is provided an optical pickup wherein one or more coils for driving the movable unit, which includes the laser unit and the objective lens in tracking directions are disposed on cylindrical surfaces, each cylindrical surface having a center axis coincident with said rotation axis, each cylindrical surface having the same diameter; and a magnet for generating a magnetic field applied to the coil is shaped such that one surface of the magnet opposed to the coil has a form of cylindrical surface that is coaxial to the cylindrical surfaces and has a diameter different from that of the cylindrical surfaces. Another surface that is far from the cylindrical surfaces is formed in a flat shape.

BRIEF DESCRIPTION OF THE DRAWINGS

The invention will be described in conjunction with the following drawings in which like reference numerals designate like elements and wherein:

FIG. 3(A) is a plan of the first embodiment;

FIG. 3(B) is a cross-sectional view of the first embodiment taken along line 3(B)—3(B);

FIG. 3(C) is cross-sectional view of the first embodiment taken along the line 3(C)—3(C);

FIG. 3(D) is a cross-sectional view of the first embodiment taken along the line 3(D)—3(D);

FIGS. 4(A)–(C) are schematic diagrams of an outer shape of a second embodiment of the present invention;

FIG. 4(D) is a cross-sectional view of the second embodiment taken along the line 4(D)—4(D);

FIG. 4(E) is a plan view of the second embodiment illustrating only a movable unit and a magnetic circuit;

FIGS. 6(A)–(C) are detailed diagrams illustrating a driving mechanism for the focusing operation in the third embodiment of the present invention;

DETAILED DESCRIPTION OF PREFERRED EMBODIMENTS

Figure 1A:
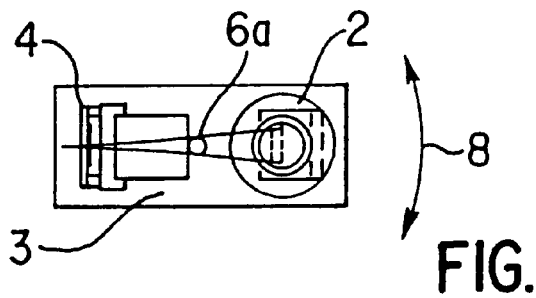
FIGS. 1(A) and (B) are schematic diagrams illustrating an arrangement according to the present invention.
Figure 1B:
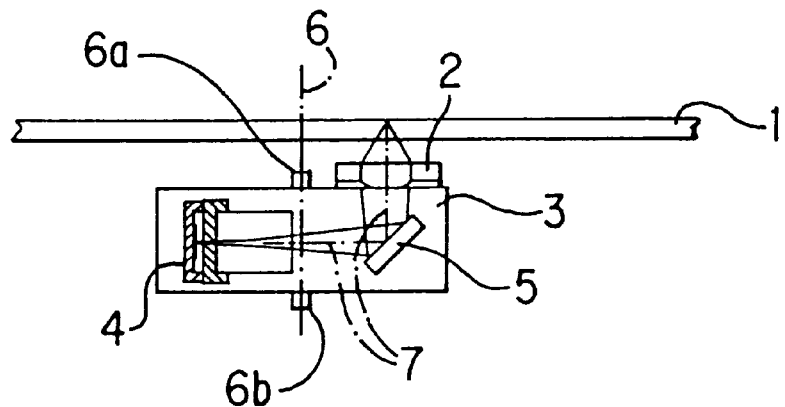

Preferred embodiments of the present invention will be described in detail in connection with the accompanying drawings in which like elements are denoted by like reference numerals.

FIGS. 1(A) and (B) are schematic diagrams illustrating a basic structure of an optical pickup according to the present invention. As shown, this structure includes a movable unit comprising an optical system including an objective lens 2, a reflecting plate 5 and a laser unit 4, a holder 3, and pivots 6a and 6b. The movable unit is supported such that it can rotate in tracking directions 8 about the rotation axis 6, which is common to both pivots 6a and 6b.

In this optical pickup, information is recorded or reproduced as follows. A light source included in the laser unit 4 emits a light beam. The light beam is reflected by the reflecting plate 5 and then focused via the objective lens 2 into a spot on a recording surface of a recording medium 1. Then, the light is reflected from the spot and travels along the same path in the reverse direction back to the laser unit 4. This light is detected by a light detecting mechanism included in the laser unit 4.

With this basic structure, as described above, an optical pickup (of the type in which an optical recording/reproducing apparatus has a laser unit and an objective lens that are driven in an integral fashion) includes an axis of rotation about which the objective lens rotates that is located at a position displaced from the center of the objective lens, the axis of rotation intersecting the optical axis of a light beam emitted by the laser unit.

Figure 2:
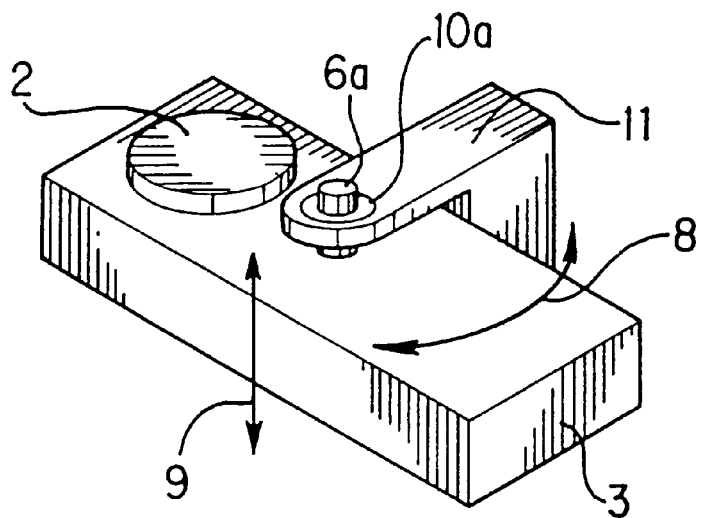
FIG. 2 is a perspective view illustrating a first embodiment of the present invention.

FIG. 2 is a perspective view illustrating a first embodiment of the optical pickup according to the present invention. The movable unit is supported by a fixing arm 11 via a bearing 10a. The pivot 6a is fitted in the bearing 10a in such a manner that the movable unit can move in the focusing directions 9 and also in the tracking directions 8.

In this embodiment, as described above, the pivot is supported by the bearing formed in a cantilever extending from a fixed portion.

FIGS. 3(A)–(D) are detailed diagrams illustrating the first embodiment of the optical pickup according to the present invention. There are provided tracking coils 12a,12b and focusing coils 13a,13b in peripheral portions of the movable unit. The movable unit is supported by the fixing arm 11 and the fixed portion 16 via the bearings 10a,10b fitted around the pivots 6a,6b.

There are also provided tracking magnets 14a,14b whose faces opposed to the tracking coils 12a,12b are magnetized in two poles. The dividing line in magnetization is parallel to the Z-direction defined in FIGS. 3(B) and 3(C). Therefore, the straight portions of the tracking coils 12a,12b parallel to the Z-direction can make an effective contribution to the driving.

The movable unit is driven in tracking directions 8 about the rotation axis 6 by the electromagnetic force arising from interaction between currents flowing through the tracking coils 12a,12b and a magnetic field produced by a yoke 17 and the tracking magnets 14a,14b opposed to the tracking coils 12a,12b, respectively.

The faces of focusing magnets 15a,15b opposed to the focusing coils 13a,13b, respectively, are magnetized in two poles. The dividing line of magnetization is parallel to the X-direction defined in FIGS. 3(A) and (C), and therefore the straight portions of the focusing coils 13a,13b parallel to the X-direction can make an effective contribution to the driving.

The movable unit is driven in focusing directions 9 by the electromagnetic force arising from interaction between currents flowing through the focusing coils 13a,13b and a magnetic field produced by the yokes 17,18 and the focusing magnets 15a,15b opposed to the focusing coils 13a,13b, respectively.

In this embodiment, as described above, coils are disposed along the substantially entire circumferential side of the movable unit, the circumferential side being perpendicular to a recording surface. Therefore, the effective total area of coils that can contribute to the driving is great enough to realize a high-speed optical pickup.

The yokes 17,18 surround the movable unit and the magnetic circuit. The yokes 17,18 are closed so that the magnetic field is prevented from leaking outside, which also improves the structural strength of the optical pickup.

In this embodiment, as described above, the yokes in the magnetic circuit for producing the magnetic field to drive the movable unit are formed in a cylindrical shape surrounding the movable unit.

As illustrated in the cross-sectional view of FIG. 3(D), the pivots 6a,6b have a common axis of rotation 6 and are separated from each other by the laser unit 4. The laser unit 4 is positioned at a correct location in the direction of the optical axis 7 in the Z-direction by the pivots 6a and 6b. The laser unit 4 is also positioned in the X-direction by the projecting portions of the pivots 6a,6b. After positioning the laser unit 4 at a correct location, the laser unit 4 is molded with a resin such that the laser unit 4 is fixed in a fixing groove within a holder 3 in an integral fashion.

In this embodiment, as described above, the pivots have portions for positioning the laser unit.

The holder 3 is shaped such that the center of gravity associated with the movable unit is substantially coincident with the intersection point between the axis of rotation 6 and the optical axis 7 thereby achieving a good balance in weight.

As described above, in this embodiment the laser unit and the objective lens are driven in an integral fashion (i.e., they are driven together as one unit). The center of the objective lens is located at one side of the center of gravity associated with the movable unit, and the light emitting point of the laser unit is located at the other side of the center of gravity.

The fixing arm 11 for supporting the movable unit is formed in a cantilever shape extending from the fixed portion 16. The bearing 10a is disposed at an asymmetric position about the center line in the Y-direction of the fixing arm 11.

According to the present embodiment, it is possible to mount this optical pickup on a seek mechanism in a variety of arrangements since this optical pickup is small in size. The longitudinal direction of the fixing arm shown in FIGS. 3(A)–(C) is not necessarily coincident with the seek direction.

Thus, according to the present embodiment, it is possible to realize a small-sized, rotation-type optical pickup suitable for high speed seek that can also perform high-speed tracking and focusing.

FIGS. 4(A)–(E) illustrate a second embodiment of an optical pickup according to the present invention.

In this embodiment, information is recorded or reproduced in a similar manner to that in the case of the first embodiment. That is, a light source included in a laser unit 4 emits a light beam. The light beam is reflected by a reflecting plate 5 and then focused into a spot on a recording surface of a recording medium 1 after passing through an objective lens 2. Then, the light is reflected from the spot and travels along the same path in the reverse direction back to the laser unit 4. This light is detected by a light detecting mechanism included in the laser unit 4.

The laser unit 4 and the, reflecting plate 5 are fixed inside a holder 3, which is provided with projecting pivots 27a and 27b having a common rotation axis 6. The holder 3 is supported in a rotatable fashion by a supporting mechanism including the pivots 27a,27b, holes 19 formed in intermediate elements and pressure plate springs 21.

The outer surface of the holder 3 is in contact with tracking coils 25a,25b and focusing coils 26a,26b.

The movable unit comprises the holder 3, the laser unit 4, the reflecting plate 5, the objective lens 2, the tracking coils 25a, 25b, the focusing coils 26a, 26b, the pivots 27a, 27b, the intermediate elements 19, and the pressure plate springs 21. This movable unit is in contact with one end of each plate spring 20a,20b, while the other end of each plate spring 20a,20b is connected to a fixed portion 22.

As for tracking magnets 23a,23b, their faces are opposed to tracking coils 25a,25b and are magnetized in two poles. The dividing line of magnetization is parallel to the Z-direction defined in FIGS. 4(B) and 4(C). Therefore, the straight portions of the tracking coils 25a,25b parallel to the Z-direction can make an effective contribution to the driving.

The holder 3 is driven in tracking directions 8 about the rotation axis 6 by the electromagnetic force arising from interaction between current flowing through the tracking coils 25a,25b and a magnetic field produced by yokes 28a,28b and the tracking magnets 23a,23b opposed to the tracking coils 25a,25b, respectively.

The faces of focusing magnets 24a,24b opposed to the focusing coils 26a,26b are magnetized in two poles. The dividing line in magnetization is parallel to the plane defined by the X- and Y-directions shown in FIG. 4(A). Therefore, the straight portions of the focusing coils 26a,26b parallel to the above-described plane can effectively contribute to driving.

The movable unit is driven in focusing directions 9 by the electromagnetic force arising from interaction between currents flowing through the focusing coils 26a, 26b and a magnetic field produced by the yokes 28a, 28b and the focusing magnets 24a,24b opposed to the focusing coils 26a,26b, respectively.

As described above, in this embodiment the laser unit and the objective lens are driven in an integral fashion. The laser unit is disposed at one side of the plane containing the rotation axis about which the objective lens rotates. The axis of rotation is located at a position displaced from the center of the objective lens. The above-described plane further contains a line that intersects the axis of rotation, the line being parallel to a seeking direction. The objective lens is disposed at the other side of the plane.

The center of gravity associated with the rotary-movement unit, which comprises the objective lens 2, the holder 3, the laser unit 4, the reflecting plate 5, the tracking coils 25a,25b, the focusing coils 26a,26b and the pivots 27a,27b is located on the axis of rotation 6 so that rotation of the movable unit is well-balanced.

The movable unit, which includes intermediate elements 19 and pressure plate springs 21 in addition to the rotary-movement unit, has a center of gravity located in the plane containing movable end portions of the plate springs 20a, 20b. Thus, the center of gravity associated with the movable unit is coincident with the center of gravity associated with the rotary-movement unit. Therefore, also in the Z-direction driving operation, it is possible to perform stable driving without rotary vibration.

In this embodiment, seeking is done in the Y-direction. Therefore, acceleration occurs in the Y-direction when the speed changes during a high-speed seeking operation. However, since the plate springs 20a,20b have high rigidity in the Y-direction and the center of gravity associated with the rotary-movement unit is on the rotation axis, the above-described acceleration does not cause rotation.

In this embodiment, the rotary-support mechanism may also be realized by using a hinge (not shown).

As described above, according to the present embodiment, it is possible to realize a small-sized rotation-type optical pickup suitable for high speed seeking, which can perform high-speed tracking and focusing. Furthermore, since support in the focusing directions is done using plate springs, production is easy. Thus, it is possible to reduce costs associated with this embodiment.

Figure 5A:
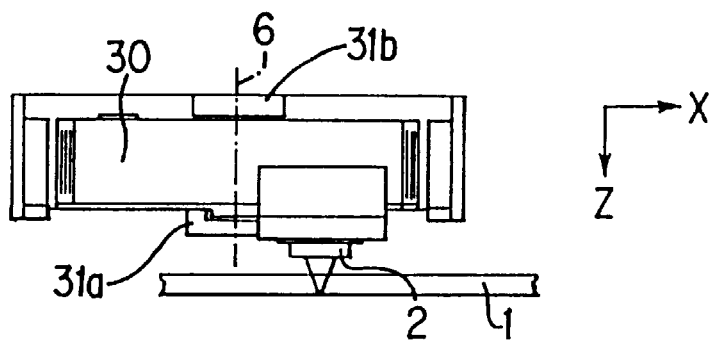
FIGS. 5(A)–(C) are schematic diagrams showing three views illustrating an outer shape of a third embodiment of the present invention.
Figure 5B:
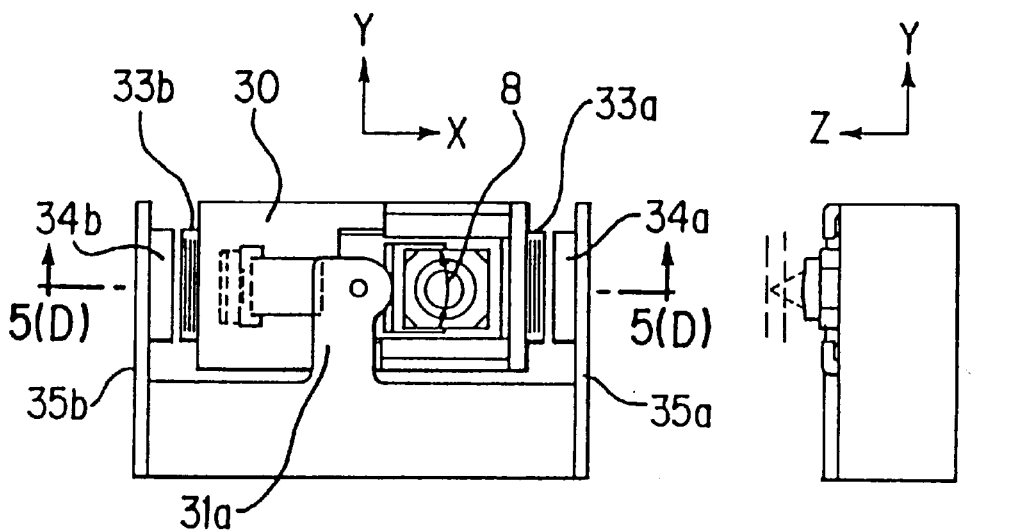
Figure 5C:
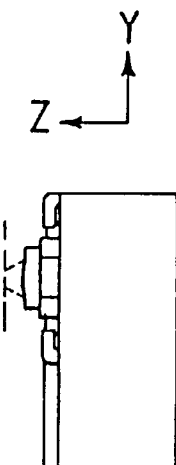
Figure 5D:
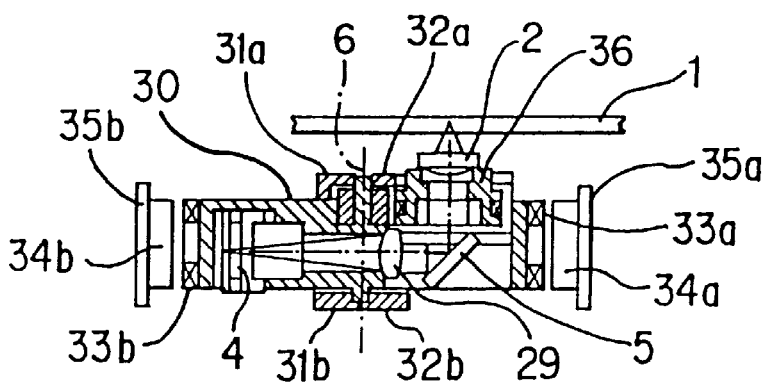
FIG. 5(D) is a cross-sectional view of the third embodiment taken along line 5(D)—5(D)

FIGS. 5(A)–(D) illustrate a third embodiment of an optical pickup according to the present invention, wherein FIGS. 5(A)–(C) are schematic diagrams illustrating its outer shape. FIG. 5(D) illustrates its cross section.

In this embodiment, information is recorded or reproduced in a manner slightly different from that in the case of the first and the second embodiments. In this third embodiment, the light emitted by a light source included in a laser unit 4 is converted to parallel light beams by a collimating lens 29, and then reflected from a reflecting plate 5. The light passes through an objective lens 2 and is focused into a spot on a recording medium 1. The light is reflected from the spot and travels along the same path in the reverse direction back to the laser unit 4. This light is detected by a light detecting mechanism included in the laser unit 4.

Since the recording or reproducing operation is performed using the parallel light beams, the objective lens 2 may be adapted to be driven separately in the focusing directions.

The laser unit 4, the collimating lens 29, and the reflecting plate 5 are fixed inside a holder 30, which is provided with projecting pivots 32a,32b having a common axis of rotation 6. The holder 30 is supported in a rotatable fashion by the pivots 32a,32b, and by holes formed in supporting cantilever arms 31a,31b.

The faces of tracking magnets 34a,34b opposed to tracking coils 33a,33b, respectively, are magnetized in two poles. The dividing line in magnetization is parallel to the Z-direction defined in FIGS. 5(A) and 5(C). Therefore, the straight portions of the tracking coils 33a,33b parallel to the Z-direction can make an effective contribution to the driving operation.

The outer surface of the holder 30 is in contact with the tracking coils 33a,33b. The holder 30 is driven in tracking directions 8 about the axis of rotation 6 by the electromagnetic force arising from interaction between current flowing through the tracking coils 34a, 34b and a magnetic field produced by yokes 35a,35b and the tracking magnets 34a, 34b opposed to the tracking coils 33a,33b.

FIGS. 6(A)–(C) are detailed diagrams illustrating a driving mechanism 36 for the focusing operation.

A movable focusing portion including a bobbin 41, the objective lens 2, and a focusing coil 42 is disposed between one end portion of plate spring 45 and one end portion of plate spring 46. A base 47 is disposed between the other end portion of the plate spring 45 and the other end portion of the plate spring 46. The plate springs 45, 46 and the base 47 form a fixed focusing portion, which is fixed to the holder 30 shown in FIGS. 5(A), 5(B) and 5(D). The movable focusing portion is supported to the fixed focusing portion by the plate springs 45,46, wherein elasticity of the spring portions 45a,45b,46a, and 46b allows the movable focusing portion to move in the focusing directions.

The faces of the focusing magnets 43a,43b opposed to the focusing coil 42 are magnetized to the same one pole. The movable focusing portion is driven in the focusing directions by the electromagnetic force arising from interaction between the current flowing through the focusing coil 42 and a magnetic field produced by yokes 44a,44b and the focusing magnets 43a,43b opposed to the focusing coil 42.

The driving mechanism 36 for focusing comprises a focusing magnetic circuit including the focusing magnets 43a, 43b and the yokes 44a, 44b; the movable focusing portion; and the fixed focusing portion. The fixed focusing portion and the yokes 44a,44b are connected to the holder 30 whereby the driving mechanism 36 for focusing is integrated with a movable tracking portion.

As described above, in this embodiment the laser unit and the objective lens are driven in an integral fashion. The laser unit is disposed at one side of the plane containing the axis of rotation about which the objective lens rotates. The axis of rotation is located at a position displaced from the center of the objective lens. The above-described plane further contains a line that intersects the rotation axis, the line also being perpendicular to a seeking direction, the line being parallel to a surface of a recording medium. The objective lens is disposed at the other side of the plane (i.e., at a side of the plane opposite from the side containing the laser unit).

In this embodiment, the rotary-support mechanism may also be realized by using a hinge (not shown).

As described above, according to the present embodiment, it is possible to realize a small-sized rotation-type optical pickup suitable for high speed seeking, which can perform high-speed tracking and focusing. Furthermore, the focusing mechanism 36 is disposed separately in such a manner that it projects in the Z-direction defined in FIGS. 6(A)–6(C). This arrangement leads to a great advantage that when the optical pickup is used in conjunction with a recording medium enclosed in a cartridge, the focusing mechanism 36 can operate within a window of the cartridge.

Figure 7:
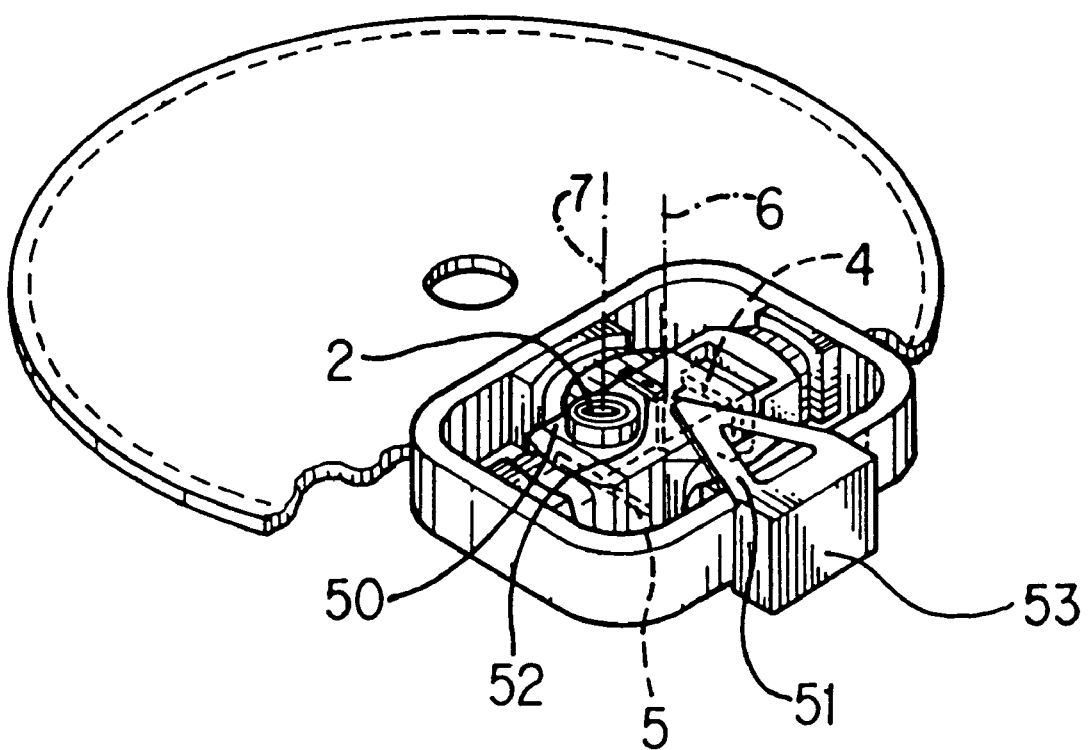
FIG. 7 is a schematic diagram illustrating a fourth embodiment of the present invention.

FIG. 7 is a schematic diagram illustrating a fourth embodiment of an optical pickup according to the present invention. A light beam emitted by a laser unit 4 included in a holder 50 intersects the axis of rotation 6, and is then reflected from a reflecting plate 5. An objective lens 2 focuses the light beam into a spot on a recording surface of an optical disk.

A movable unit comprising the holder 50, the laser unit 4, the reflecting plate 5, and the objective lens 2 is supported to a base 53 or a fixed portion via two plate springs 51 (only one plate spring is shown in FIG. 7) and two hinges 52 (only one hinge is shown in FIG. 7) connected to respective movable ends of the plate springs 51, wherein the plate springs 51 allow the movable unit to move in focusing directions and the hinges 52 allow the movable unit to rotate in tracking directions.

Figure 8A:
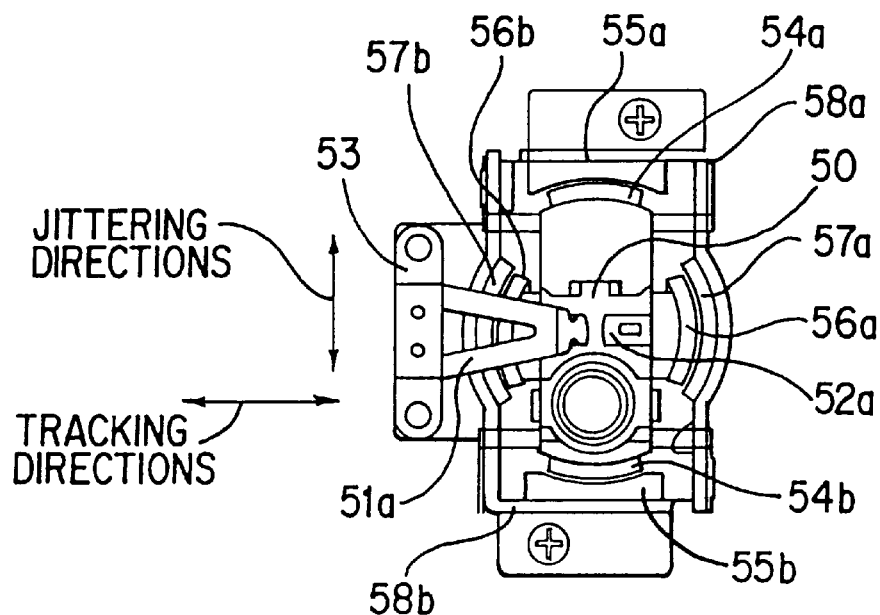
FIG. 8(A) is a plan view of the fourth embodiment of the present invention.
Figure 8B:
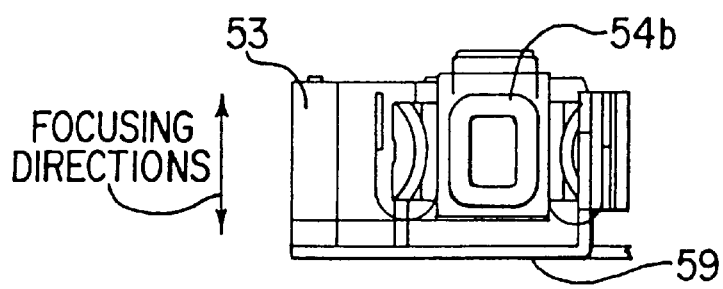
FIGS. 8(B) and (C) are plan views illustrating portions that do not include a yoke, a tracking magnet, and a focusing magnet.
Figure 8C:
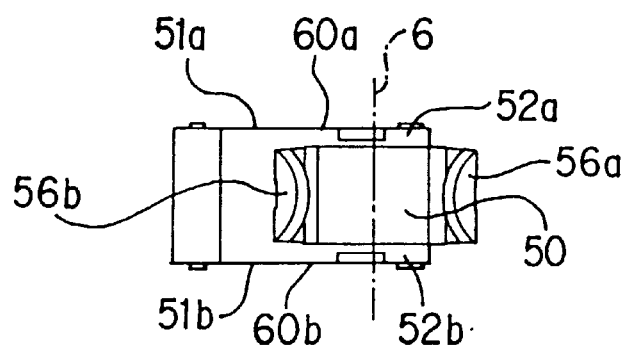

FIG. 8(A) is a detailed plan view of the fourth embodiment. FIG. 8(B) is a front view with the yoke 58b, the tracking magnet 55b, and the focusing magnet 57b removed from the optical pickup. FIG. 8(C) is a front view illustrating how the suspensions 60a,60b are attached.

In the movable unit, there are provided focusing coils 56a,56b fixed on cylindrical surfaces having the same diameter and having axes that are coincident with the axis of rotation 6, wherein the focusing coils 56a,56b are disposed at locations opposed to each other in the tracking direction. Tracking coils 54a,54b are fixed on another cylindrical surface having a diameter different from the above diameter (greater than the above diameter) in the case of the example shown in FIGS. 8(A)–8(C) and having axes that are coincident with that of the cylindrical surfaces on which the focusing coils are fixed, wherein the tracking coils 54a,54b are disposed at locations opposed to each other in a jittering (tangential) direction.

A fixed portion of the optical pickup comprises a fixing plate 59, a base 53 fixed to the fixing plate 59, the yoke 58a to which the tracking magnet 55a and the focusing magnet 57a are fixed, and the yoke 58b to which the tracking magnet 55b and the focusing magnet 57b are fixed. The yokes 58a,58b are secured with screws to the fixing plate 59.

The suspension 60a comprises a plate spring 51a and a hinge 52a, where one end portion of the plate spring 51a is fixed to a base 53 so that this end portion acts as an fixed end. Since the plate spring can bend, the other end portion near the hinge 52a is free in movement in the focusing directions, and thus acts as a free end. An end portion of the hinge 52a near the plate spring 51a is fixed to the plate spring 51a so that this end portion acts as a fixed end in the rotary movement in the tracking direction. The other end portion of the hinge 52a opposite to the plate spring 51a acts as a free end portion, which can rotate in the tracking direction.

A suspension 60b is constructed with a plate spring 51b and a hinge 52b in a similar manner to that in the case of the suspension 60a.

As shown in FIG. 8(C), the movable unit is disposed between end portions of the suspensions 60a and 60b near the hinges. The two hinges are fixed to the movable unit such that the two hinges have the common rotation axis 6. Thus, the movable unit can move in the focusing directions and can rotate in the tracking directions.

In this embodiment, the center of gravity associated with the movable unit is on the rotation axis 6. Since the center of the forces that drive the rotation is coincident with the center of gravity, the optical pickup does not suffer from resonance during the rotating operation.

Furthermore, since the focusing coil 56b is disposed between the suspensions 60a and 60b, it is possible to employ a large-sized focusing coil, and thus the length of the coil which contributes to the driving force can be greater to obtain greater driving force.

As described above, in this embodiment, the laser unit and the objective lens are driven in an integral fashion, one or more coils for driving the movable unit (including the laser unit and the objective lens) in focusing directions are disposed on cylindrical surfaces. Each cylindrical surface has a center axis coincident with the rotation axis. Each cylindrical surface for the focussing directions has the same diameter. The rotation axis about which the objective lens rotates is located at a position displaced from the center of the objective lens. One or more coils for driving the movable unit in tracking directions are disposed on cylindrical surfaces that are coaxial to the above-described cylindrical surfaces (for the focussing drive) and have a common diameter different from the common diameter of the focussing coil cylindrical surfaces. At least one coil of the above-described coils is disposed between the suspensions that mount the movable unit to support structure.

If the diameter of the cylindrical surface on which the focusing coils 56a,56b are disposed is reduced, then it becomes possible to reduce the size of the suspensions 60 between which the focusing coil 56b is disposed, and thus a smaller size of optical pickup can be achieved.

In this embodiment, since the face of any magnet opposed to a coil is formed on a cylindrical surface, the gap between the magnet and the coil is maintained constant during the movement or rotation of the movable unit. As a result, the change in the magnetic flux density becomes small, whereby a stable operation can be achieved. Furthermore, since the gap is stably maintained constant, it is possible to reduce the gap so as to obtain a higher magnetic flux density thereby achieving a higher operation speed.

Figure 9A:
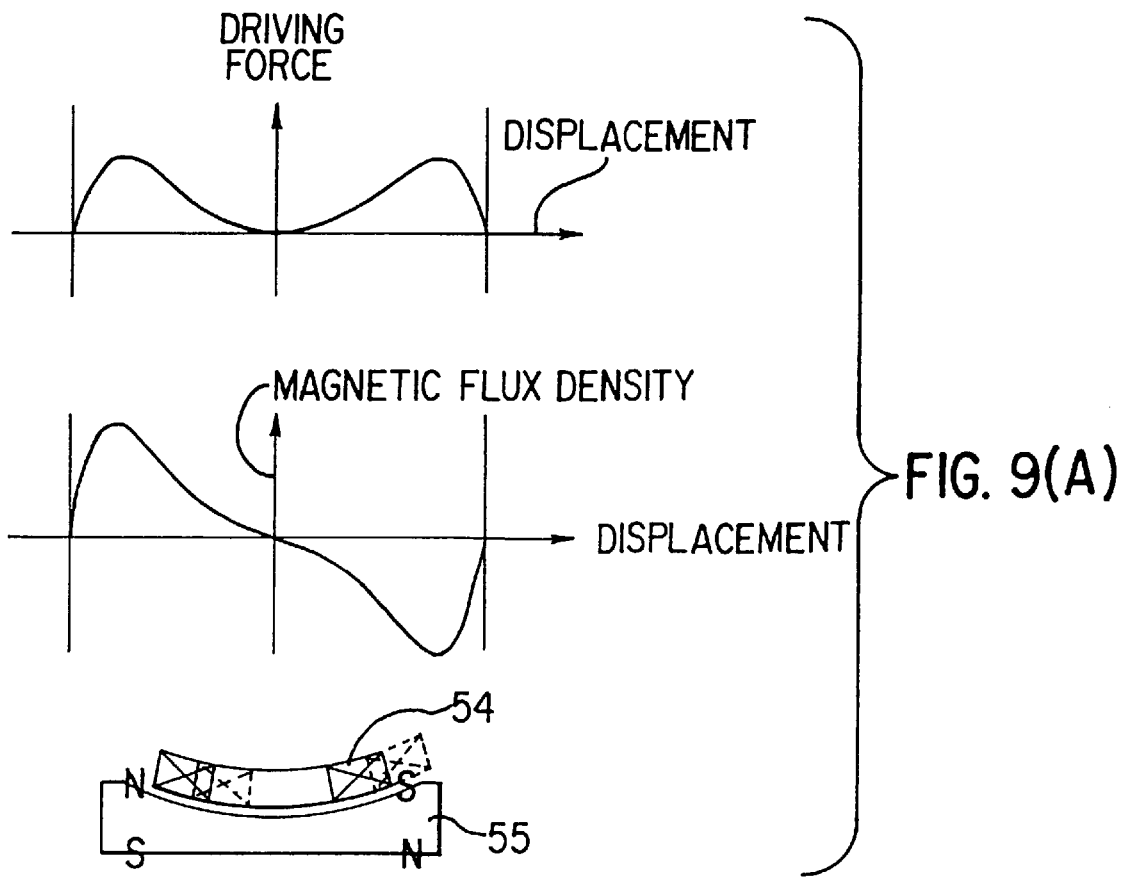
FIG. 9(A) illustrates an advantage of the fourth embodiment of the present invention and shows the driving force and the magnetic flux density as a function of tracking displacement.
Figure 9B:
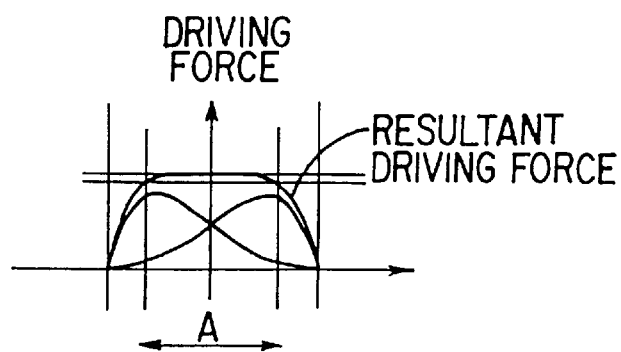
FIG. 9(B) illustrates another advantage of the fourth embodiment of the present invention and shows the driving force as a function of the tracking displacement.

One of features of the fourth embodiment is that the faces of the tracking magnets 55a,55b opposed to the coils have cylindrical surfaces while the faces opposed to the yokes have a flat shape. As an alternative, the surface opposed to the yokes also may be a cylindrical shape having a larger diameter than that of the cylindrical surface opposed to the coils. Referring to FIGS. 9(A) and 9(B), the driving force characteristics of tracking coils and tracking magnets will be described.

As shown in FIG. 9(A), the tracking magnet 55 is magnetized into two poles. When a current flows through the tracking coil 54, an electromagnetic force causes the tracking coil 54 to be displaced to a position represented by broken lines. The distribution of the magnetic flux density associated with the tracking magnet 55 is shown in FIG. 9(A), wherein the thickness distribution of the magnet causes the magnetic flux density to be higher near both end portions of the magnet. As a result, when the current flowing through the coil is maintained constant, the driving force as a function of the coil position is higher near both end portions of the magnet as shown in FIG. 9(A). Thus, as shown in FIG. 9(B), the resultant force of the driving forces exerted on two points of the coils becomes flat in distribution due to summing. If the operation is done within the range denoted by "A" in which the driving force or driving torque is substantially constant, highly stable operation can be achieved.

Figure 10:
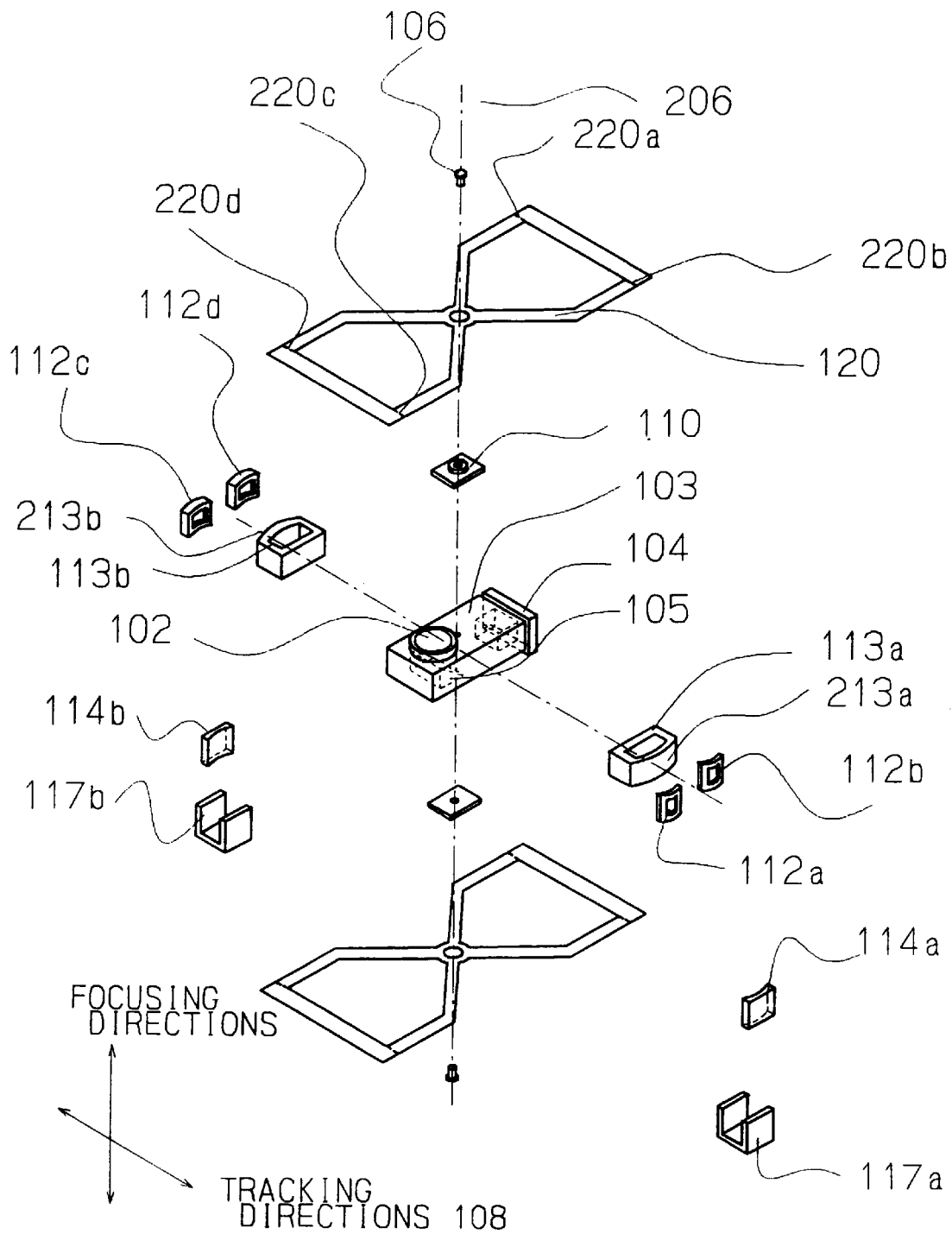
FIG. 10 is an exploded, perspective view illustrating a movable unit according to a fifth embodiment of the present invention.
Figure 12:
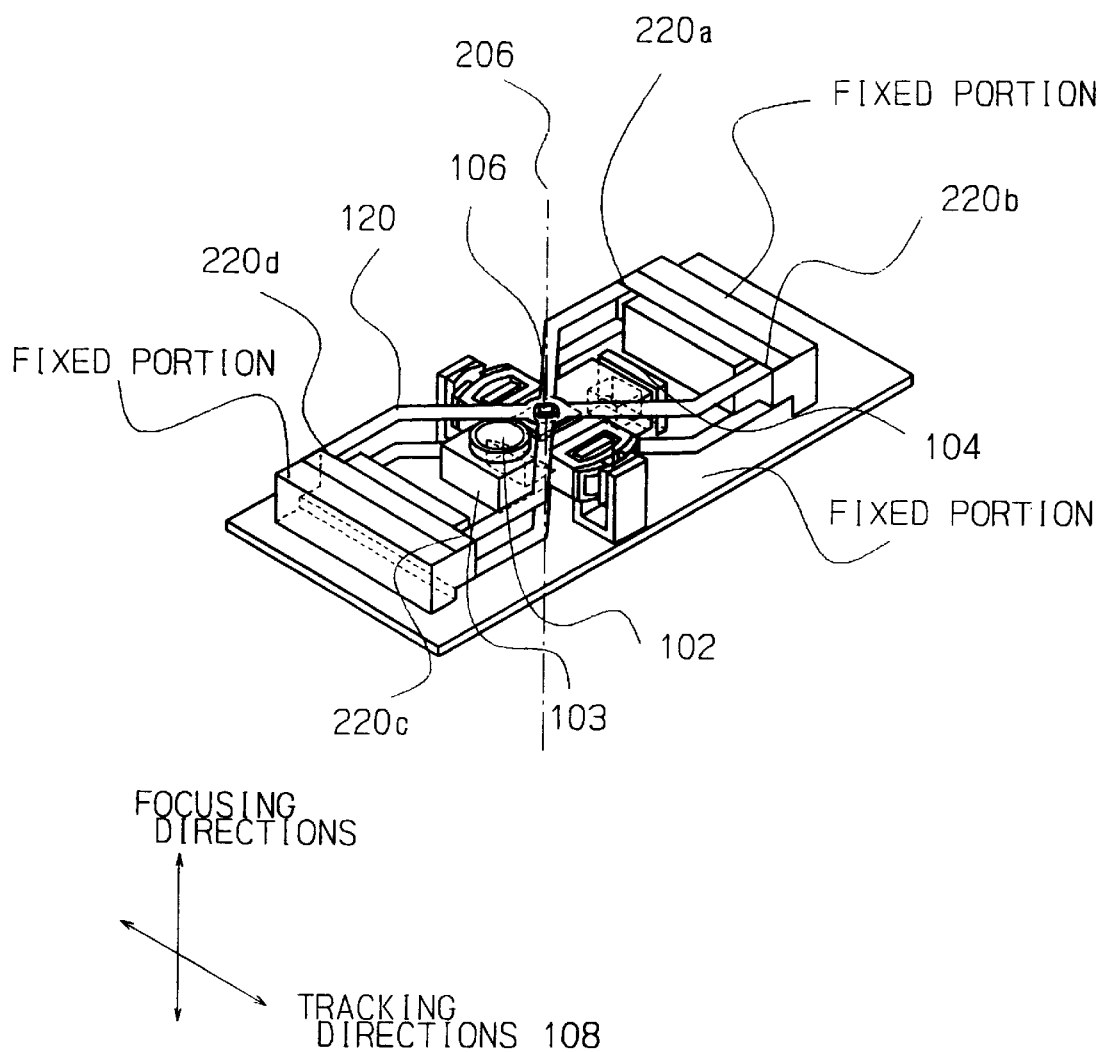
FIG. 12 is another perspective view of the fifth embodiment of the present invention.

FIG. 10 is an exploded, perspective view of a movable unit according to a fifth embodiment of the present invention. FIG. 12 is an outlined perspective view of the movable unit according to the fifth embodiment.

An optical system including a laser unit 104, an objective lens 102, and a reflecting plate 105 is secured to a holder 103 as described in the first embodiment, and can be moved in an integral fashion in tracking directions 108 with the axis 206 of rotation being used as a center.

At both sides of the rotation axis 206 of the holder 103 in the tracking directions 108, focusing coils 113a and 113b are secured by adhesion or other means. The focusing coils 113a and 113b each have cylindrical surfaces. Being integrated with the holder, the focusing coils form cylindrical surfaces 213a and 213b whose center is the rotation axis 206.

On the cylindrical surfaces 213a and 213b, four tracking coils 112a to 112d in total, two for each surface, are secured. The tracking coils 112a to 112d have curved shapes. Being integrated with the holder 103 through the focusing coils 113a and 113b, the tracking coils form cylindrical surfaces having a center at the rotation axis 206.

Magnets 114a and 114b are secured at positions opposite those of the tracking coils 112a to 112d with a certain gap in fixed portions through yokes 117a and 117b. The surfaces of the magnets 114a and 114b opposite the tracking coils form cylindrical surfaces having a center at the rotation axis.

As described above, the movable unit including the optical system, the holder, the focusing coils, and the tracking coils is driven in the focusing directions, that is, the directions of the rotation axis 206, and the tracking directions 108 whose center is the rotation axis 206.

With the configuration described above, the following advantages are obtained.

When the movable unit is driven in the tracking directions 108 with the rotation axis 206 as a center, the gap between the magnets and the focusing and tracking coils is constant since they form cylindrical surfaces having a center at the rotation axis. Therefore, the magnetic field applied to each coil is nearly the same and stable driving forces can be obtained. In addition, the coils and the magnets never collide.

Furthermore, since the same magnets are used for driving the movable unit in the focusing directions and the tracking directions, the least number of magnets are required.

Figure 11:
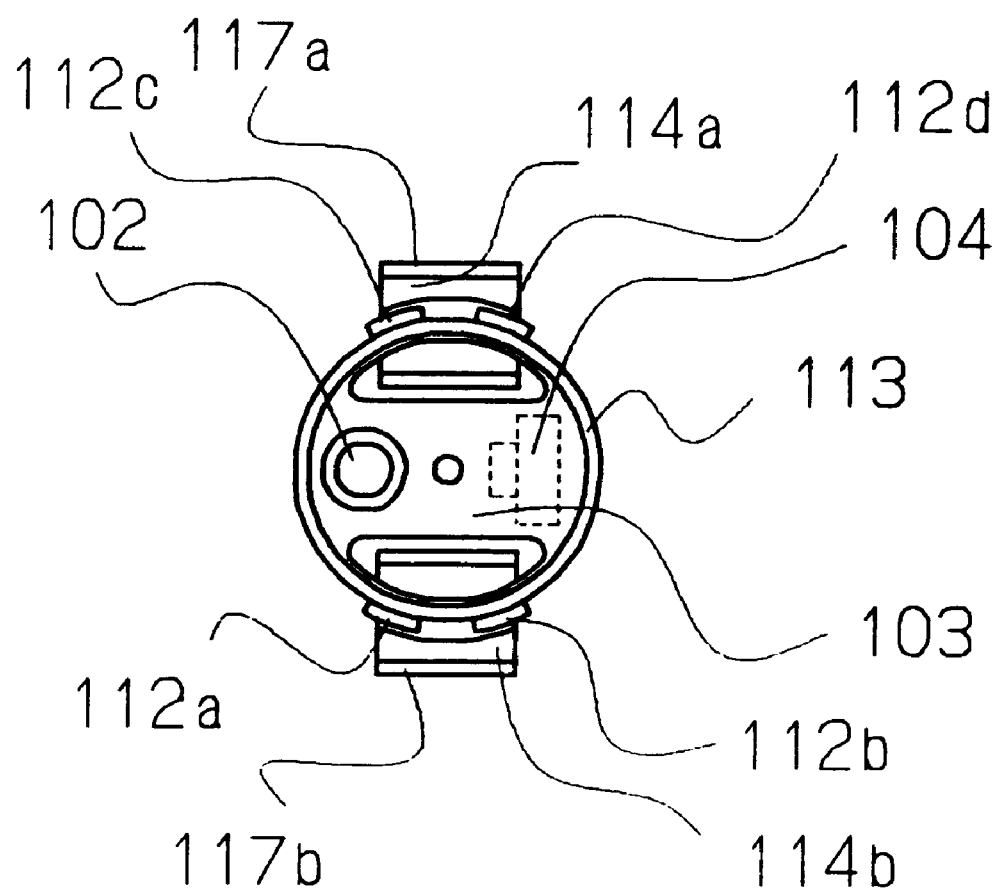
FIG. 11 is a top view illustrating the movable unit of the fifth embodiment of the present invention.

In this embodiment, the two focusing coils are secured to side faces of the holder. As shown in FIG. 11, for example, leads may be wound directly onto the holder at the side faces. The same effect can be obtained when a total of two tracking coils are disposed at both sides of the rotation axis in the tracking directions.

Support mechanisms according to this embodiment will be described below by referring to FIG. 10.

A focusing leaf spring 120 having a substantially X shape viewed from the top is secured to fixed portions (not shown) at four ends 220a to 220d and serves as a both-end-fixed leaf spring. A bearing 110 is secured at nearly the center of the focusing leaf spring 120. A rotation shaft 106 passing through the center hole of the bearing 110 and secured to the holder 103 holds the focusing leaf spring 120 and the bearing 110 with a desired clearance against the holder 103 by a protrusion provided at the end thereof. A total of two sets of the above-described configuration are provided in the focusing direction (the direction of the rotation axis 206) of the holder to support the holder 103.

Since the focusing leaf spring 120 has a maximum amplitude of elastic deformation in the vicinity of the center to which the bearing 110 is secured, the movable unit including the holder 103 is elastically supported in the focusing directions. That is a first support mechanism. The focusing leaf spring is made mainly from metals such as copper and stainless steel. It may also be made from resin.

A second support mechanism including the bearing 110 and the rotation shaft 106 rotatably supports the movable unit about the rotation axis 206 with a function of the shaft and the bearing.

With the above-described configuration, the following advantages are obtained.

The focusing leaf spring 120 is elastically deformed in the focusing directions easily, but it has high rigidity in the other directions and is not easy to be deformed. In other words, even when an external force is applied to the movable unit from a direction other than the focusing directions due to an effect of a disturbance, the movable unit is prevented from being deformed. An effect of a disturbance is also prevented by disposing the center of gravity of the movable unit on the rotation axis 206.

It is clear from experiments that, in general, in a support system using a shaft and bearing, friction largely affects sliding along the axis direction as compared with rotation. When the focusing support is achieved by a shaft and bearing, smooth movement of the movable unit may be prevented by friction. In this embodiment, since the focusing support is achieved with support by the first support mechanism including the focusing leaf spring and with rotatable support by the second support mechanism including the bearing and the shaft, it has been confirmed from experiments that effects caused by friction can be ignored. In other words, the movable unit can be smoothly driven in the focusing and tracking directions.

As described above, according to one aspect of the present invention, the axis of rotation about which the objective lens rotates is located at a position displaced from the center of the objective lens, and the axis of rotation intersects the optical axis of a light beam emitted by the laser unit (i.e., the optical axis of a light beam travelling between the laser unit and a reflecting mirror (mirror 5)). With this arrangement, it is possible to realize a small-sized optical pickup.

According to another aspect of the present invention, the laser unit is disposed at one side of the plane containing the axis of rotation about which the objective lens rotates. The axis of rotation is located at a position displaced from the center of the objective lens, the above-described plane further containing a line that intersects the rotation axis, the line being parallel to a seeking direction; and the objective lens is disposed at the other side of the plane. With this arrangement, it is possible to realize an optical pickup that can provide a good balance in weight.

According to another aspect of the present invention, there are provided two or more rotating hinges having a common axis of rotation and that are disposed separately in the common axis of rotation, and the optical axis of a light beam emitted by the laser unit intersects the axis of rotation. With this arrangement, it is possible to realize an optical pickup that can provide a large driving force and that can operate at high speeds.

According to still another aspect of the present invention, one or more coils for driving the movable unit including the laser unit and the objective lens in focusing directions are disposed on cylindrical surfaces, each cylindrical surface having a center axis coincident with the axis of rotation, each cylindrical surface having the same diameter, the axis of rotation about which the objective lens rotates being located at a position displaced from the center of the objective lens. One or more coils for driving the movable unit in tracking directions are disposed on cylindrical surfaces that are coaxial to the above-described cylindrical surfaces and have diameters different from those of the above described focussing cylindrical surfaces. With this arrangement, it is possible to realize an optical pickup that can provide a stable driving force and that provides stable operation.

According to still another aspect of the present invention, one or more coils for driving the movable unit (including the laser unit and the objective lens) in focusing directions are disposed on cylindrical surfaces, each cylindrical surface having a center axis coincident with the rotation axis, each cylindrical surface having the same diameter, the rotation axis about which the objective lens rotates being located at a position displaced from the center of the objective lens. A magnet for generating a magnetic field applied to the one or more coils is shaped such that one surface of the magnet opposed to the one or more coils has the form of a cylindrical surface, which is coaxial to the above-described cylindrical surfaces, and which has a diameter different from those of the above-described cylindrical surfaces. The other surface of the magnet opposite from the cylindrical surfaces is formed in a flat shape. With this arrangement, it is possible to realize an optical pickup that operates with stable torque and highly stable control characteristics even during high-speed operation.

According to still yet another aspect of the invention, when the movable unit is driven in the tracking directions with the rotation axis as a center, the gap between the magnets and the focusing and tracking coils is constant since they form cylindrical surfaces with the rotation axis being used as a center. Therefore, the magnetic field applied to each coil is nearly the same and stable driving forces can be obtained. In addition, since the coils and the magnets never collide, a short circuit of a coil cannot occur.

Further, since the same magnets are used for driving the movable unit in the focusing directions and the tracking directions, the least number of magnets are required and the number of components required can be reduced. In addition, the focusing leaf spring has high rigidity in directions other than the focusing directions and is not easily deformed. In other words, even when an external force is applied to the movable unit from a direction other than the focusing directions due to an effect of a disturbance, the movable unit is prevented from moving. Stable driving for the movable unit can be implemented. An effect of a disturbance is also prevented by disposing the center of gravity of the movable unit on the rotation axis 206. Employing a support mechanism including the bearing and the shaft, which only works in the rotation direction, which is slightly affected by friction, also contributes to stable driving of the movable unit.

According to the present invention, as described above, it is possible to realize a small-sized optical pickup including an integrated laser and movable unit, which provides good balance in weight, high stability, and high driving force. Thus, it is possible to realize an optical recording/reproducing apparatus that can transfer data at a high rate of speed over a short access time by using an optical pickup having a high speed driving mechanism suitable for high speed seeking.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An optical pickup having a movable unit that includes a laser unit emitting a light beam and an objective lens, comprising:
   a flexible support plate for elastically supporting a holder included in said movable unit, the support plate having first and second fixed ends; and
   a support securing said flexible support plate to said holder so that the holder is rotatable relative to the flexible support plate, said support being disposed in the vicinity of the center of said support plate between the first and second ends.

2. The optical pickup of claim 1, wherein the movable unit has an inner peripheral surface and a center of gravity thereof being located on an axis of rotation, and at least two tracking coils disposed on opposite sides against said axis of rotation on said movable unit, for driving said movable unit in tracking directions, wherein said objective lens is rotated around said axis of rotation at a position shifted from the center of said objective lens, and said axis of rotation intersects said light beam.

3. An optical pickup according to claim 2, wherein said inner peripheral surface is formed by a focusing coil disposed at a side face of said movable unit.

4. An optical pickup according to claim 1, wherein a focusing coil is disposed on a side face of said holder and at least two tracking coils are disposed on the side face which said focusing coil forms.

5. An optical pickup according to claim 4, wherein a focusing coil is disposed on a side face of said holder, said focusing coil forming a cylindrical surface having its center at a rotation axis obtained by said support, and at least two tracking coils are disposed on said cylindrical surface.

6. The optical pickup of claim 1, further comprising a second flexible support plate for elastically supporting the holder, the second support plate comprising first and second fixed ends and being rotatably secured to the holder in the vicinity of the center of the second support plate between the first and second ends, the support plate and the second support plate being disposed on opposite sides of said holder.

7. An optical pickup according to claim 6, wherein each of said support plates comprise leaf springs.

8. The optical pickup of claim 1, wherein the support comprises a bearing and a shaft receivable in the bearing for securing the flexible support plate to the holder, the bearing spacing the flexible support plate from the holder.

9. An optical pickup, comprising:
   a movable unit including a laser unit and an objective lens;
   a support base; and
   a flexible support plate having first and second opposite ends fixed to the support base, the movable unit being rotatably secured to the flexible support plate in the vicinity of the center of the flexible support plate between the first and second ends.

* * * * *